INVENTORS:
WALLACE H. COULTER
WALTER R. HOGG
BY
Silverman + Cass
ATTORNEYS

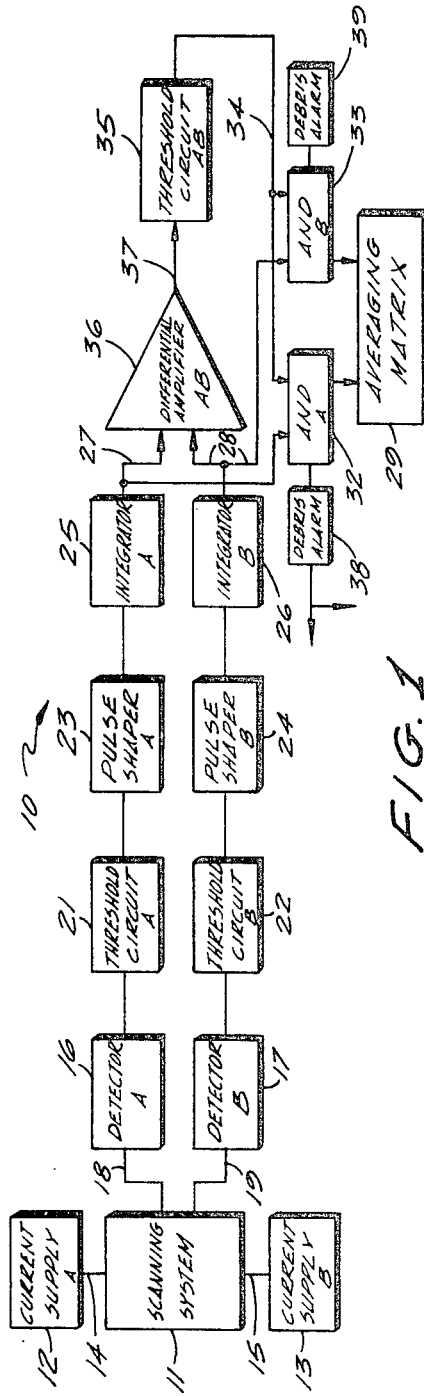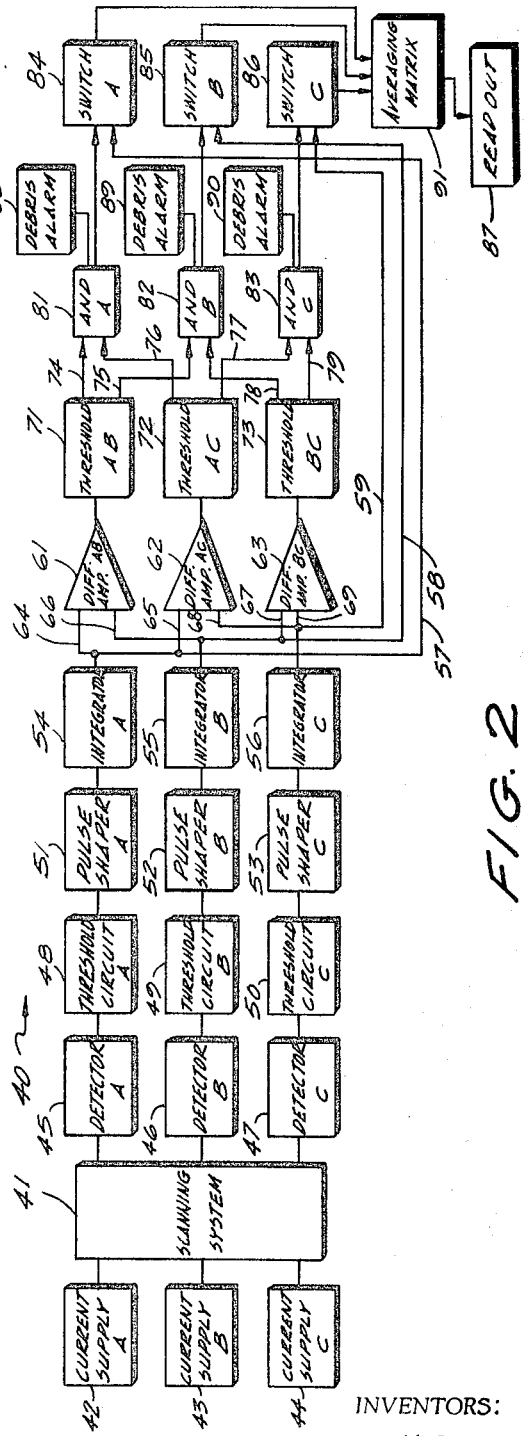

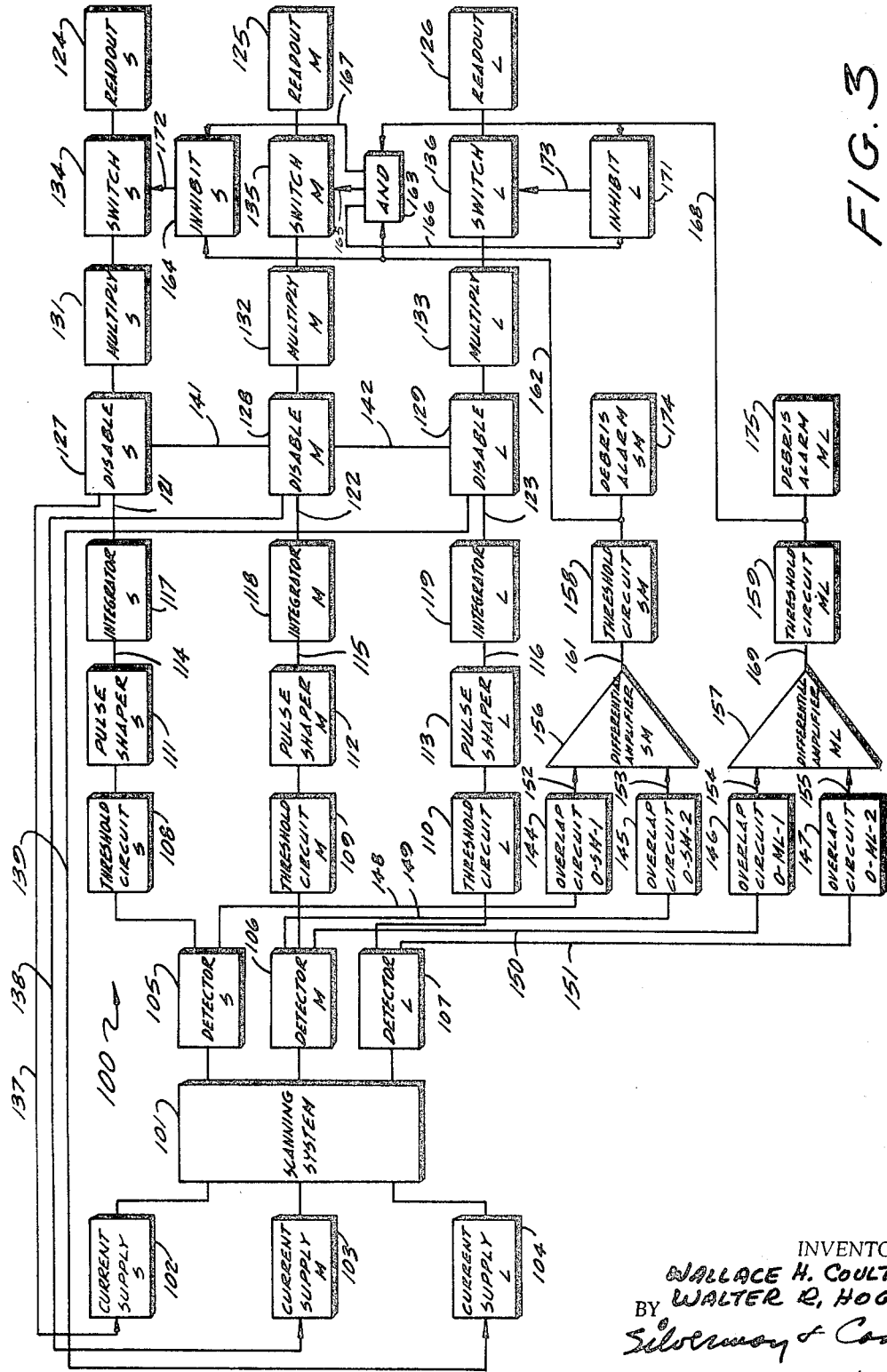

United States Patent Office 3,444,463
Patented May 13, 1969

3,444,463
PARTICLE ANALYZING APPARATUS AND METHOD UTILIZING MULTIPLE APERTURES
Wallace H. Coulter, Miami Springs, and Walter R. Hogg, Hialeah, Fla., assignors to Coulter Electronics, Inc., Hialeah, Fla., a corporation of Florida
Filed Feb. 14, 1966, Ser. No. 527,146
Int. Cl. G01n 27/00; G06f 7/38; G06g 7/00
U.S. Cl. 324—71
24 Claims

ABSTRACT OF THE DISCLOSURE

Electronic systems for use with a Coulter particle analyzing apparatus having a plurality of apertures of related sizes, in which circuitry is provided which discretely accumulates the detected signals from each aperture, differentially compares the accumulating signals from two or more apertures, and identifies an aperture which is blocked or otherwise is malfunctional. Embodiments of these systems also contain circuitry which discard the signals from the malfunctioning aperture and average the remainder or which provide a direct readout from the operative apertures.

---

This invention relates generally to particle analyzing apparatus of the type in which particles which are suspended in a fluid medium are caused to move through an electric current path of small dimensions and more particularly is concerned with a structure for enabling the results obtained from such apparatus to be achieved with increased accuracy, reliability and in a shorter time than heretofore. The invention also relates to a method which produces the results mentioned above.

In a more specific aspect, the invention is concerned with achieving these results, that is, greater accuracy, reliability and speed, through the use of a plurality of scanning elements, by passing the fluid with suspended particles relative to all of such scanning elements. This achievement forms the principal object of the invention.

In order to acquire an appreciation of the invention it is well to consider the methods and apparatus in use as of the present time for the counting and sizing of particles. The invention herein is not limited to one particular type of apparatus and the methods practiced therewith; however, the details and explanation of this invention will be discussed in connection with apparatus and techniques based upon the principles of operation pioneered by Wallace H. Coulter, one of the present inventors.

According to the principles and techniques of Coulter, there is provided an electronic counting and sizing apparatus, hereinafter termed the Coulter apparatus, which is described and claimed in U.S. Patent 2,656,508 and which produces an electrical signal each time that a particle in suspension in a fluid passes through an electric current path of small dimensions, which, in the first commercial apparatus is a minute aperture in a wall of insulating material disposed between two bodies of the fluid suspension. The apparatus includes means for moving the fluid through the aperture to carry the particles along with such fluid; a source of electric current having a constricted flow path between the bodies of fluid on opposite sides of the wall also through the aperture; electrodes immersed in the fluid on opposite sides of the wall and connected to the source of current; a detector connected to the electrode and responsive to the changes in resistivity or electrical impedance of the aperture contents each time that a particle passes therethrough and some form of counter to respond to the signals detected.

In its various forms, the apparatus is known and sold throughout the world under the trademark Coulter Counter and it includes means for obtaining a readout of the information coming from the detector. Since the amplitude of the signal generated by the passage of a particle through the aperture is proportional to the actual solid volume of the particle, the apparatus has been widely used for sizing as well as counting, and various applications have been made utilizing multiple channels for obtaining statistical information on size distribution. The aperture in effect "scans" the suspension passing through it, and reference will be made hereinafter to the portion which produces the signals as a scanning system. This may include means for moving the fluid, such as a siphon or manometer; means for metering the fluid such as a metering device of the type described in U.S. Patent 2,869,078; means for containing the fluid, such as beakers tubes, conduits and the like; means for coupling the current source and detector to the fluid, such as electrode systems and leads; and means for establishing the minute opening in the wall between bodies of fluid, such as the aperture or known size formed in a wafer or other carrier member set into a wall of a glass tube immersed in a beaker of sample fluid, etc.

The scanning system which will be referred to hereinafter may include on-stream apparatus, such as for example, conduits which have continuous flow of fluid therein and in which there are apertures through which fluid is permitted or caused to pass.

As indicated, the invention revolves on the use of multiple apertures being used in the apparatus so that signals obtained from the respective apertures as a result of the common concentrate passing through such apertures are compared and/or combined simultaneously, either at the time or at a later time through the use of storage devices.

The earliest Coulter apparatus is fairly well described in the earlier of the two patents mentioned above. The commercial device used an electronic amplifier to produce signals related to the respective particles passing through the aperture. A variable threshold circuit enabled the user to accept signals whose amplitudes exceeded a single threshold level which could be set by the user, so that the output from the threshold circuit consisted of signals caused by particles whose size exceeded that which was represented by the threshold level at which the apparatus was set. The threshold circuit was calibrated to relate to particle size.

An improved form of the Coulter apparatus utilized a so-called window, that is, a pair of threshold circuits, establishing adjustable levels related to particle size. Thus, the user could reject all signals which occurred below the lower threshold level and above the upper threshold level, and could make a plurality of tests of a given sample changing the location of the window each time. This would give data enabling a statistical determination of size distribution of a system. Suitable mathematical computation enabled one to derive the integral and differential curves of particle distribution which give the descriptions of these types of systems which are needed in many industries.

Particle systems or samples are importantly of two types, with relation to the sizes of particles. One type is that which has particles of substantially the same size, and having little variation. Typical of systems of this kind are blood cells, spores, and many other kinds of biological particles. The dynamic size range of such particles is quite narrow and the apparatus used for counting and sizing such particles itself need not have wide dynamic range. All data required may be gathered by using an aperture whose size, and hence sensitivity, is optimum. Minimum use of thresholds for sizing such particles means that a simple apparatus like the one with the single threshold described above may be used.

In working with what may be termed "mono-size" particles, data reduction for analysis is a relatively simple matter and does not occupy a great deal of time. The use of multiple apertures is indicated for increased speed and reliability in obtaining data.

The second type of particle system is a type in which the sizes, that is, volumes, of particles are widely diverse with the smallest being hundreds of times smaller than the largest, and existing in quantities which may be hundreds of thousands of times more than the occurrence of the largest. Such systems, which may be said to comprise "multisize" particles could exist in biological samples, but most often are recognized as occurring in industry. Typical substances of this kind are powders, dusts, slurries, contaminants, abrasives, and many more forms of materials. The dynamic ranges of such systems are extremely great and the problem of data reduction is quite involved also.

To count the numbers of particles in each of a number of consecutive ranges is tedious and quite difficult, even with the Coulter apparatus. Since the usual form of data in the particle art is percent mass above a stated size, data conversion is involved and tedious.

In the use of Coulter apparatus of the type which uses a single threshold, data conversion, for wide range particle size systems, is time-consuming. The double threshold device provides data in a simpler form, but it should be apparent that even this kind of apparatus does not use the maximum potentialities of the apparatus. An aperture which passes the largest particle without clogging must be quite large, hence, its sensitivity to the smaller particles is decreased. Where a sample run is made using the same aperture each range is run consecutively and the same quantity of suspension is passed through the aperture.

Reduction of time has been accomplished in prior devices in two ways—one, by having the aperture signals applied to a large number of threshold circuits simultaneously to obtain the count for each range in a single run, and two, by operating on the counts for each range, assuming that the apparatus already has been provided with means to apply each range count simultaneously to a plurality of different channels, with factors which provide a substantial step in the reduction of the data obtained from the apparatus.

These methods do not utilize the maximum efficiency of the principle of the apparatus because they utilize a single aperture for the entire sample study. The aperture then, must be a compromise of the factors of sensitivity, clogging, coincidence of particles, time of run and concentration of sample. The invention herein enables the minimum of compromise to be made.

Recognizing this, multiple runs are often made with different size apertures. The smaller aperture is used to run the sample for the smaller particles and at high dilutions and a larger aperture is used for the larger particles at lower dilutions. The danger of clogging the smaller aperture increases, however, even assuming there is no debris whatever, unless the size of aperture is larger than the largest particle expected to be encountered. The alternative is to "scalp" or decant the sample. This is done by using Stokesian methods to settle the heavier particles and draw off a sample from the top of the settling vessel which is devoid of particles larger than a size likely to clog. This, of course, is time-consuming and difficult and is a source of error unless done with extreme care and skill. Some workers prefer the use of screening techniques for the same purpose.

The invention enables the construction of apparatus which enables the Coulter device as well as other particle counting and sizing apparatus capable of using the teaching to increase its potentialities and capabilities. The improvement increases accuracy, reliability and usefulness.

Several characteristics of the Coulter Counters, which are common to optical counting and sizing devices affect accuracy, reliability and the usefulness of such apparatus.

Since particles are being passed through small constrictions, debris will often clog the constriction. The effect of such obstruction has long been recognized as a necessary evil, and indeed much work has been done to warn of its presence in the aperture. In any event, where a sample run has been made and the aperture clogs, either wholly or partially, the data obtained from that run are invalid and cannot be used. Where the technician is alerted by some alarm, he may reset the apparatus. If the apparatus is attended, a microscope or projector enables a visual check of the aperture, and a cathode ray tube display gives a quick electronic picture that is useful to detect debris.

One important object of the invention is to increase the reliability of a particle analysis device by decreasing the effects of aperture blockage. In achieving this object one is enabled to continue a sample run with confidence that the data obtained are accurate notwithstanding the presence of clogging particles in the sample. The invention contemplates the use of several apertures, each producing signals, and having circuitry to average or combine the signals, but also having a circuit which may be termed a voting circuit, that determines on the basis of some chosen standard, how much deviation there is or may be between apertures to detect whether or not one is abnormal and to reject the information from that aperture.

Another characteristic of prior devices is based upon the use of such particle analyzing devices for obtaining particle distribution of a system which has a wide dynamic range, as described above. According to the invention, a plurality of apertures are immersed in a sample and each produces its own signals as a result of the passage of particles therethrough. Each aperture is selected to be of a size which is the optimum for a particular range and its detector circuit is constructed to respond to signals only in that range.

Each size aperture is capable of responding to a rather wide range of particle sizes but the upper and lower ends of such range are not desirable. Clogging, coincidence, and deterioration of response occur when the use of the full range is attempted. Optimum aperture size relative to range of particle size contemplates choosing a size of aperture and a range of particle size so that only the center of the aperture's range of capability is used. This eliminates much of the difficulties associated with attempts heretofore made to stretch the usefulness of a single size aperture. Such difficulties consist of increased coincidence at the lower end of the size range, poor statistics due to low concentration and flow rate at the upper end of the range. If sufficient sample is scanned for accurate statistics at the upper end, the probability of clogging is enormously increased.

Voting circuits may be used to enable surveillance of apparatus in which the apertures are of varying sizes, to invalidate data which proves to arise from apertures that have become clogged by debris or larger particles. The voting circuit in this, as well as the case of single sized apertures, may operate debris alarms.

Still another characteristic of prior devices is concerned with coincidence. When particles pass through an aperture, although it is expected and desired that they should pass through one by one, it is known that there will be coincident signals due to two or more particles existing in the aperture simultaneously. Studies have shown that there is a relationship between the size of the aperture and the volume of fluid which is contained in the sample passed through the aperture. A factor is applied to raw count to adjust for coincidence. In apparatus which has a single aperture the coincidence factor is controlled by the volume of fluid only, that is, for any given concentration of particles. Since coincidence is directly proportional to the volume of the aperture, reducing this volume can reduce the coincidence of particles occurring in the aperture. One must consider the problems of blockage by debris and large particles, and hence the choice of an aperture for use in a given particle system is a matter of compromise. In prior devices, the choice was limited, because the single aperture was required to handle the entire family of particles. Although the problems still exist in an apparatus such as contemplated by the invention herein, there is substantially greater flexibility because instead of being required to choose one catch-all aperture, one may choose the individual ones of a plurality which provide the minimum of both coincidence and clogging, considering the system under study. Achieving this advantage is not a principal object of the invention, but rather is an advantage which attaches.

Other advantages might be considered under different circumstances. One might think of the fact that a given quantity of sample may be processed in the apparatus faster with a plurality of apertures than with one, but again the clogging problem must be considered.

Before discussing the details of the invention, it might be pointed out here that undoubtedly the most annoying of problems in the particle analysis art is the effect of clogging. This being uppermost in the mind of the ones skilled in this art, it is axiomatic that for any given size of aperture, increasing the number of apertures to $n$ and passing $1/n$th of the sample through each aperture would not appear to solve the blockage problem for concentration studies. The total data would still appear to be invalid in the event that a blockage occurs in any one aperture.

Likewise, in distribution studies, similar obstacles would naturally occur to those in this field, discouraging the use of multiple apertures.

By the use of the invention herein, the use of multiple apertures in both concentration and distribution studies substantially decreases the adverse effects of blockage, and achieving this advantage is an important object of the invention.

Considering first concentration studies of particle families, the invention provides means for enabling the user to ignore the data from one of several apertures which has been clogged during a sample run, and use the results from the others. Thus, assuming that there are three apertures all of the same size and each is intended to pass one-third of a given volume of sample, and that one of the apertures clogs part way through the run, the other two apertures produce data which is completely capable of giving the desired results. Not only is there a saving in time, but there is a substantial increase in reliability.

If each aperture has its own read-out, the two which match substantially are used and the other is disregarded. If there is an accumulating apparatus, it may have a time factor for each read-out and indicate the total percentage of volume actually scanned by giving total time of operation for each aperture and total count derived from each. A preferred form of the invention has the signals produced by each aperture compared with the signals from each of the others, and when there is a variation of a given amount between such comparisons caused by one of the apertures blocking, the data from that aperture is discarded. Such a system has an averaging network which averages the output from each channel and feeds the resulting data into a suitable read-out, and is provided with a switching system that drops out the data from the channel whose aperture is blocked as soon as blockage occurs. The averaging operation continues thereafter, but utilizes only the data received from the channels whose apertures are clear. The discard of unwanted data is achieved by the voting circuits of the invention which will be described hereinafter. Such voting circuits can be used in situations where the number of apertures is greater than two and two or more signal channels begin to produce faulty information.

Since the probability of two apertures clogging at the same time and thereby giving the same signal results is the product of their probabilities, this is too remote to be considered of consequence. It is understood of course that if there were three channels, two of which had identical information outputs, and the third of which was different, the data from the third would be disregarded. Thus, if the third were correct, and the other two incorrect but equal, the apparatus would produce false information since the third would be rejected and the identical two would be passed. The probability of this occurring is even more remote than indicated since, not only must the clogging occur at the same time, but also the signal outputs as a result of clogging must be substantially the same.

The ultimate achievement obtained through the use of the invention and occasioned by a substantial increase in the reliability of a Coulter Counter, for example, is unattended operation. If the use of a plurality of apertures in a particle analysis apparatus relieves skilled personnel from continuous surveillance and permits their talents to be applied elsewhere, while the apparatus is running a sample or samples, a considerable advance is accomplished. This, of course, leads toward automatic operation of the apparatus.

The discussion above has been concerned primarily with the use of the apparatus for concentration studies, and it has also been concerned with situations where the sizes of all of the apertures are equal. In the case of particle systems of the second type mentioned above where distribution is of primary importance, the invention provides additional advantages. The apertures are graduated, and may be operating channels which represent different ranges of the system. Accordingly, the smaller apertures are more sensitive, and their increased tendency to clog may be offset by permitting them to operate for much shorter times. This gives a distinct advantage in decreased likelihood of clogging.

In carrying out the invention, the flow of suspension is simultaneous through all of the apertures, except in those arrangements in which the apertures are of different size. In this latter case, the flow through the smaller apertures will be a fraction of the flow through the larger, since there is no need to continue passing sample through the smaller as the larger. In the usual industrial sample, there will be millions of the smaller particles as compared to only a few of the maximum sized particles, and their distribution is likewise varied. One may obtain an excellent sampling by permitting flow through the smallest aperture a small fraction of the flow required in the larger sizes.

The circuitry of the invention which accomplishes the channeling of the respective signals from the apertures and the discrimination and voting needed to accomplish the objects of the invention will be explained in detail below. With respect to the structure, the principal changes in structure over the scanning arrangements known is in the means for supporting the apertures, for flowing the fluid and for applying current and deriving signals. Reference to apertures herein is intended to means the passageway which establishes the constricted path through an insulating wall for both the flow of suspension as well as the electric current. In a well-known form of Coulter Counter there was a glass container within which the sample was placed, and there was a glass tube having a minute opening in its side wall immersed in the container so that the opening was below the level of the sample. The glass tube was a part of an enclosed system having the suspension fluid therein, connected to a source of vacuum and a manometer-syphon using mercury as the means to draw suspension through the opening. The opening was usually a fine hole in a wafer cemented, fused or otherwise set into a wall of the tube, and the tube could be disconnected from the stem for cleaning, replacement, etc. The tube was known as the aperture tube, and when reference was made to the word aperture, it was considered to be the passageway defined by the walls of the hole. An aperture was said to have effective volume, that is, the included volume within the opening as well as portions of the axial ends of the space bulging outward where the electric current density is heavy enough to influence the signal produced by a passing particle.

A source of vacuum was connected to the enclosed system through a valve, which when opened, unbalanced the mercury column in the manometer-syphon while starting to draw suspension from the container through the aperture into the aperture tube. After the column was unbalanced, the vacuum suorce was disconnected, and the suspension continued to be drawn through the aperture by the return of the mercury column to its balanced condition. Electrodes in the path of the mercury column turned the counting mechanism on and off while metering a precise quantity of fluid passing through the aperture. Electrodes immersed respectively in the container and aperture tube on opposite ends of the aperture provided the terminals for the current source and for the input to the detector.

One object of the invention is to provide a scanning system in which multiple apertures are utilized, there being a number of fluid receptacles or vessels equal to the number of apertures, and the fluid moving means being arranged so that fluid is moved simultanously through all apertures from a single sample container into all of the receptacles. This enables all receptacles downstream of the apertures to be insulated from one another. An electrode is immersed in each of the downstream receptacles, each electrode being connected to its own individual detector. A common electrode for all apertures is immersed in the upstream sample container to minimize coupling between apertures. Each aperture has its own current supply in addition to its own detecting system.

The features of the invention reside in structure and method and result in benefits and advantages in addition to those alluded to above. In the discussion which follows, and in the detailed description of the illustrations in the drawings, such added advantages will be brought out. The drawings illustrate preferred embodiments, and for the most part are diagrammatic in nature, since the electrical components which are utilized can be constructed by those skilled in this art once having been given the benefit of the teachings hereof.

In the drawings:

FIG. 1 is a block diagram of a highly simplified multiple aperture particle analyzing apparatus constructed in accordance with the invention, using only two apertures, both of which are assumed to be of the same size.

FIG. 2 is a block diagram of another apparatus in which three apertures are used, all of the same size.

FIG. 3 is a block diagram of a relatively simplified multiple aperture particle analyzing apparatus constructed in accordance with the invention, using only three apertures, but the apertures being of different sizes.

Figures 4, 5:
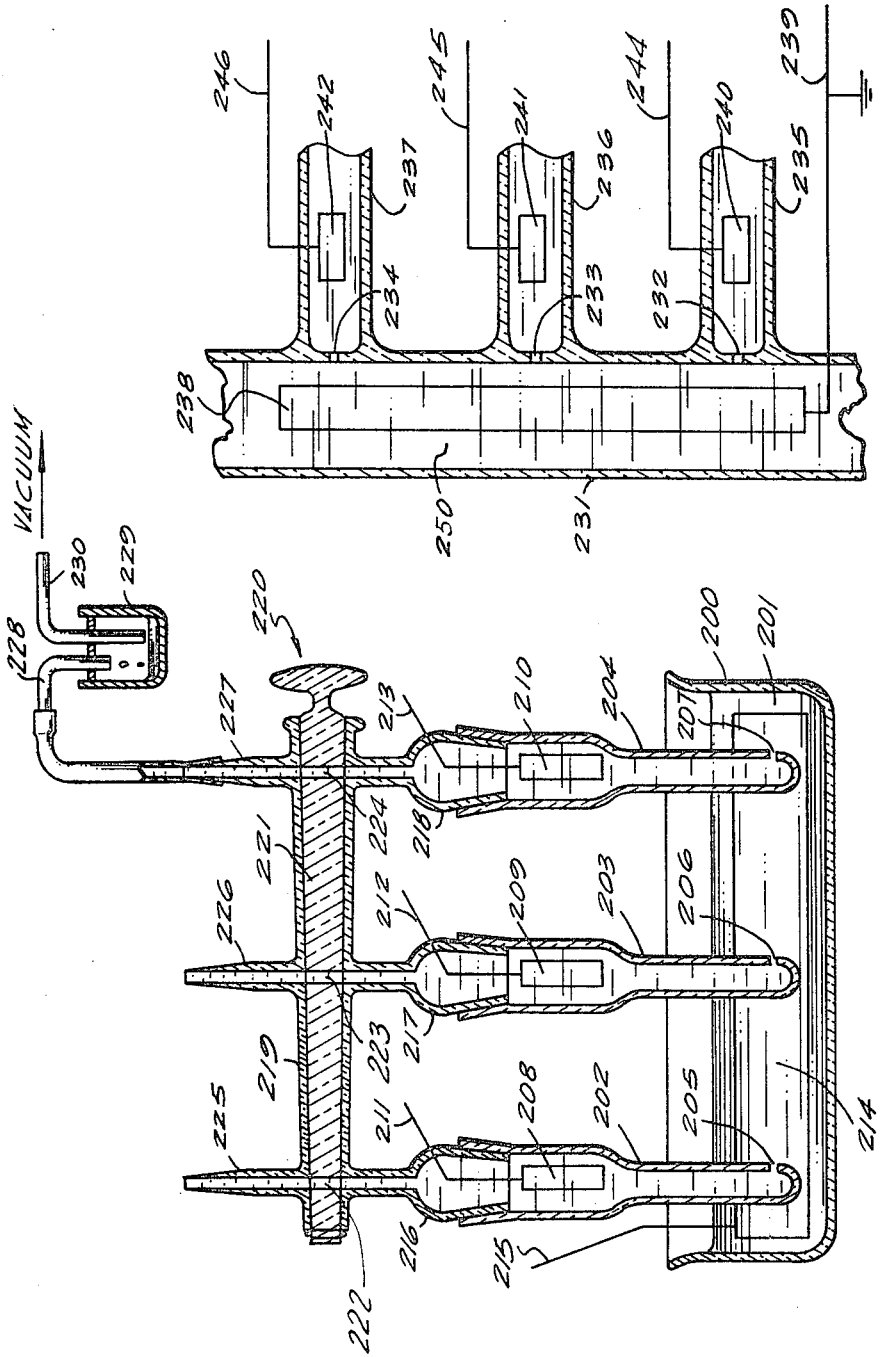
FIG. 4 is a fragmentary sectional diagrammatic view showing an arrangement of multiple apertures for use in carrying out the purposes of the invention, applied to a static sample system.
FIG. 5 is a fragmentary sectional diagrammatic view showing an arrangement of multiple apertures for use in carrying out the invention applied to a continuous flow through or on-steam sample system.

In the most basic form of the invention, as illustrated in the block diagram of FIG. 1, the block referred to as the scanning system will consist of a plurality of components whose function it is to scan the fluid suspension and produce signal responsive to the passage of particles. In this case, there will be a pair of apertures, each having its own downstream fluid moving means, its own electrode, and connections as indicated to its own power supply and its own detector. The upstream portion of the system will comprise a single common sample vessel with a common electrode and connections to the current supplies and detector, usually by way of ground.

The apertures for this apparatus, which is designated generally 10, are assumed to be identical, and for the purposes of this initial explanation, it may also be assumed that the system is one using a fixed quantity of sample. The invention obviously is applicable to on-stream or so-called flow through sampling, but this will be mentioned in detail later. The apertures will arbitrarily be called A and B and some form of metering will be included in the scanning system to enable an exact quantity of fluid suspension to be passed through the aperture.

The scanning system is generally designated 11 and connection of the current sources 12 and 13 for the respective apertures is indicated by the lines 14 and 15. Likewise, the connections from the scanning system to the respective detectors 16 and 17 are diagrammatically indicated at 18 and 19. For purposes of discussion, the components which are intended to carry signals originating with the respective apertures will be designated channels, and no specific meaning need be attached to the use of this word, as in the case of analyzing apparatus operating in a plurality of different size ranges.

For each of the channels there can be threshold circuits 21 and 22 which discriminate between the signal pulses produced in the respective detectors 16 and 17 so that only the desired ones pass to the respective pulse shaper circuits 23 and 24. Such threshold circuits 21 and 22 may be of the single level variety or they may be of the type which utilize adjustable windows. Although the invention is applicable in scope to apparatus in which the signals from the apertures A and B represent different ranges, for the purpose of this explanation, it will be assumed that the count in each channel should be the same, within limits of ordinary expected deviation, as determined by the concentration. One might expect, for example, that anything that exceeds a difference between counts of 1% would be suspect.

If there were no debris or large particles, the threshold circuits 21 and 22 could be arranged to drive counters by some suitable circuitry directly and the counts added or averaged to give a complete count with good statistics. Blockage could have the effect of increasing or decreasing the counts in the respective channels, so that the production of two widely divergent counts would render the information from both channels useless, requiring both to be discarded. In later described forms of the invention, where there are three or more channels and only one produces counts which are suspect, only it is discarded and the other two used.

The outputs from the threshold circuits 21 and 22 are applied to pulse shaper circuits 23 and 24 each of which is arranged to provide outputs that are electric signals indicative of the respective counts. These are analog signals, and could be in the form of pulses or charges whose amplitudes are proportional to the signal producing the same. The outputs of the pulse shapers 23 and 24 are accumulated by the integrators 25 and 26 and provide outputs at 27 and 28 in the form of voltages which are proportional to the counts in each channel. But for the problem of invalid counts caused by blockages, the voltages could be applied to an averaging matrix at 29 and thence could be used to drive some form of read-out 31 which either converts the resulting electrical quantity into digital form, if desired.

Instead of a direct connection to the averaging matrix, the outputs 27 and 28 are connected to AND circuits 32 and 33, respectively, of any desirable type, each AND circuit thus having one input. The other input for each AND circuit is provided by the output 34 of the threshold circuit 35 which in turn is connected to the differential amplifier 36. As seen in FIG. 1, the outputs 27 and 28 are connected to the input of the differential amplifier 36.

The normal condition of the threshold circuit 35 is to provide a signal at its output 34, so that so long as there are voltages on the outputs 27 and 28 as well, both AND circuits will pass the signals from the integrators 25 and 26 to the averaging matrix 29. This condition obtains if the outputs 27 and 28 are substantially equal within the limits set by the threshold circuit 35. The differential amplifier 36 will produce an output signal at 37 which is proportional to the difference between the voltages at 27 and 28. Accordingly, the closer these latter signals match, the lower the output at 37. The threshold circuit 35 may be adjusted so that there will be no change in the output 34 unless the signal at 37 exceeds some predetermined level, which is chosen by the operator. When this occurs, the threshold circuit 35 changes the signal at 34 to one which will not cause the AND circuits 32 and 33 to respond. In simple form, the signal at 34 may be fully cut off. With no input at 34, neither of the AND circuits will pass any signals, thereby rejecting the results of the sample run. A suitable debris alarm may be operated by the AND circuits 32 and 34 as shown at 38 and 39. The right hand alarm 39 may be audible or visual, while the left hand alarm 38 may be of the form which re-sets equipment, cancels data thus far accumulated on the read-out 31, etc.

The apparatus 10 achieves a degree of reliability which is negative in character, because of the small number of channels. It is of a type which assures that if there is a blockage there will be no chance of false results being obtained. Other forms of the invention assure that results will be obtained if a blockage occurs by recognizing and discarding false and invalid readings.

The principles which are involved in the operation of the apparatus of FIG. 1 may be applied to digital devices.

In the apparatus 40 of FIG. 2, the principal differences are that there are more than two apertures, specifically three being used, and a voltage circuit is provided to choose two channels as valid if one, in this example the third, should give a count that is obviously wrong. The apertures are designated generally A, B and C and again it is assumed that all are the same size. The scanning system 41 provides the necessary fluid moving apparatus, aperture tubes, apertures, electrodes and so forth. The individual current supplies are shown at 42, 43 and 44 connected with the scanning system, and the outputs are applied to the detectors 45, 46 and 47 respectively. As in the case of the two channel structure 10 of FIG. 1, there are threshold circuits 48, 49 and 50, pulse shaper circuits at 51, 52 and 53 and integrators at 54, 55 and 56. The outputs of the integrators are 57, 58 and 59, respectively. These outputs are applied to the differential amplifiers 61, 62 and 63 in permutations, so that each amplifier has two inputs from two different integrators. Tracing the leads from the integrators it will be seen that the channel A integrator 54 has one connection to the input 64 of the AB amplifier 61 and another connection to the input 65 of the AC amplifier 62; the channel B integrator 55 has one connection to the input 66 of the AB amplifier 61 and another connection to the input 67 of the BC amplifier 63; the channel C integrator 66 has one connection to the input 68 of the AC amplifier 62 and another connection to the input 69 of the BC amplifier 63.

Each of the amplifiers has its output connected to the threshold circuits 71, 72 and 73, respectively. Using the same principles as described above, signals will appear at the respective amplifier outputs only if the inputs to the amplifier whose output is involved have different voltages. Thus, if the voltage output from the integrator 54 differs from the voltage output from the integrator 55, a signal will be generated in amplifier 61 which is proportional to that difference. If we assume for the sake of the discussion, that the signal from the C channel integrator 56 is substantially the same as the signal from the A channel integrator 54, then the voltages applied to the threshold circuits 71 and 73 will be higher than the voltages applied to threshold circuit 72.

As in the case described above, the threshold circuits 71, 72 and 73 are adjustable to provide a level which may or may not be exceeded by the output of the respective differential amplifiers. Assuming that this level is adjusted for a predetermined voltage, if there is no output from a given one of the differential amplifiers, signifying substantially equal inputs to that differential amplifier, then, depending upon the type of circuit, there may or may not be a signal at the output of the threshold circuits. In the apparatus shown, the threshold circuits are of the type which have no output unless there is a signal at their input. Thus, assuming the situation where the B channel has clogged and is producing erroneous results, the outputs 74 and 75 from the threshold circuit 71 will have a voltage therein; the outputs 76 and 77 from the circuit 72 will not have any voltage thereat, because there is no differential signal generated in amplifier 62 and; the outputs 78 and 79 from the circuit 73 will have voltages, because there is a differential voltage generated in amplifier 63.

These outputs are applied to AND circuits 81, 82 and 83 which control the output switches 84, 85 and 86, respectively. It may be assumed that these switches are normally closed, and that their output is applied to some form of readout at 87. This may be any averaging, accumulating, or counting device or combinations thereof. There may be individual read-outs for the respective channels. If none of the AND circuits have outputs, the switches 84, 85 and 86 all pass the outputs from the integrators and the channels all contribute to the finally determined reading, either by way of averaging or accumulating. In the situation described, however, since it has been assumed that the readings from the channel B are erroneous, all read-outs will not give proper values.

There will be outputs at 74, 75, 78 and 79, because the voltage from the B channel is different from the voltages of either channels A or C. There will be no outputs at 76 and 77 because the voltages from channels A and C are fairly well matched, that is, within the limits set into the threshold circuit 72. The AND circuit 81 has a signal at only one input and hence it has no output signal. The AND circuit 82 has a signal at both of its inputs, and hence it will produce an output that closed the switch 85. Accordingly, no signals from the channel B will be able to pass to the read-out 87 and only signals from channels A and C will affect the final result. It is obvious that the erroneous results from channel B have been rejected, but the sample run has not been useless. There is sufficient information in the other two channels to give a valid count and to enable averaging or accumulating, if desired, on separate read-outs.

At the same itme that a signal appears at any output of the AND circuits 81, 82 or 83 a debris alarm such as shown at 88, 89 and 90 may be energized to identify the rejected channel and warn of the occurrence of a blockage.

The circuit described is identified as a vote circuit because the channels each contribute information to pick out the faulty one.

In FIG. 3 there is illustrated an apparatus 100 whose nature is somewhat more sophisticated than either of the apparatuses 10 and 40. In this case, it is assumed that the primary information sought is information on distribution of the particles in a system of the second type having widely diverse sizes. It is assumed further that there are three different apertures, designated S, M and L for small, medium and large. The added features and advantages of this type of structure will be brought out in the description thereof.

Again, the scanning system 101 is composed of means for moving fluid, aperture tubes with apertures, electrodes and so on. The aperture tubes have their own electrically isolated supplies 102, 103 and 104. Each channel has its own electrically isolated detector, as shown at 105, 106 and 107; its own threshold circuit as shown at 108, 109 and 110; and its own pulse shaper as shown at 111, 112 and 113. The principal difference between the apparatus 100 of FIG. 3 and the others described is that in this case each aperture passes only particles in a certain range, to give independent information about the concentration of particles of a specific size in its own range. The size of the aperture is thus chosen to be the optimum for the range of particles to be passed, being small for the smaller ranges, medium for the medium ranges and large for the larger ranges. Thus, there are no equal signals to be expected from any two ranges which include different sizes of pulses.

The invention is well-suited to give the maximum of desirable information for such a particle system, and the first part of the explanation will omit the use of a voting circuit. The structure is adaptable to a voting circuit, however, and the second part of the explanation will describe its use to discard information automatically which is found to be erroneous.

The small range channel output at 114 will apply signals in the form of charges, each representing a signal pulse, to an integrator 117 which accumulates these charges and provides a voltage at its output 121 which represents the count. Each of the medium and large channels also has an output 115 and 116, respectively, feeding charges to an integrator 118 and 119, respectively, to provide similar voltages at 122 and 123. If all channels were permitted to operate for the same duration, there would be a final count indicated in some form of read-out device, such as 124, 125 and 126 whose values would give distribution information. This assumes that the channels are defined by the windows produced through the use of the differential threshold circuits 108, 109 and 110.

While this information is valuable and decreases the time that a sample run need be made, the statistics of this form of analysis indicates that the apertures must all pass the same volume of fluid to give validity to the information gathered. Since the small aperture cannot pass fluid as fast as the larger, it would require more time to pass the same volume, but this would increase the chances of clogging. Additionally, since in a heavily populated region one does not require as much of the fluid sample for good distribtuion statistics as in those regions where the population of particles is sparse, there seems to be no reason for flowing suspension through the smaller apertures as long as through the larger. As a matter of fact, only a fractional amount need be scanned for good results. Accordingly, one can compute the most practical sigmas for the respective apertures, and apply multiplication factors to the counts for arriving at a properly weighted read-out for each channel.

For example, first taking into account the flow rate because of the different size apertures, assume that any equal time of sampling would require an adjustment of count in each channel such that the small channel count would have to be multiplied by a factor $a$, the medium channel count by a factor $b$ and the large channel count by a factor $c$. Next, assume that it is determined that each channel will be permitted to operate for a different time, so that another factor will have to be used to adjust for this. The smaller channel count would additionally have to be multiplied by a factor $x$, the medium channel count by a factor $y$ and the large channel count by a factor $z$. Although the factors $a$, $b$ and $c$ are fixed by the choice of apertures, the factors $x$, $y$ and $z$ need not be. One may choose different times of operation, which would require adjustment of the proper factors $x$, $y$ and $z$ so that the count read-out from each channel represents the true count for the same volume of sample flowing through each aperture, although actually this has not occurred. Accordingly, there may be a timer device, which in the diagram is called a disable circuit, following each integrator. The signals at 121, 122 and 123 are respectively applied to the disable circuits 127, 128 and 129, and from these circuits the outputs are multiplied by the necessary factors in the circuits 131, 132 and 133 respectively. In the simple form of the invention, the resulting electrical quantity is used to drive the read-out devices but in the apparatus having vote circuits, these outputs first pass through normally closed switch means 134, 135 and 136, respectively.

The factors of the multiplier circuits, according to the explanation given above are $ax$ in multiplier 131, $by$ in multiplier 132 and $cz$ in multiplier 133. The timer portions of each disable circuit will stop the count at the adjusted time and in addition may disable the current supply circuits through suitable connections indicated at 137, 138 and 139, respectively.

In the case that there is no time factor, there need be no disabling circuits, but in the event that there is a time factor, the relationship of the factors $x$, $y$ and $z$ must be maintained. Any independent change in the time which one channel is permitted to count will destroy the validity of all results, unless accounted for in manual computations made from the resulting read-outs. This is an inconvenience which to some extent offsets the advantages of the circuit. Accordingly, there is illustrated some form of connection between the disable circuits, shown at 141 and 142 to enable the maintaining of the relationships between the time factors $x$, $y$ and $z$. Such connection may be mechanical or electrical. For example, it could be a system of gearing which produces a proportional change in all timers if any one is changed.

Extending the value of the apparatus and taking advantage of the convenience of permitting only a small sample of fluid to pass through the smallest aperture, one might establish a count which gives a fully satisfactory sigma for the smallest aperture and provide circuitry to set this count as a limit voltage into the disable circuit. As soon as the voltage reaches this value, the counting in the smallest channel stops. This is easily done by means of electronic pumping, charge circuits, and the like, operating as a thresh circuit.

Thus, the time that the smallest channel will be counting is indeterminate and depends upon the distribution of the smaller particles in a given sample, but if the relationship of factors $x$, $y$ and $z$ is fixed by virtue of the connections 141 and 142, the time of counting in each of the other channels will change accordingly, so that the final results are always valid. If desired, instead of changing the time of counting of the other channels, the multiplying factor may be varied in any suitable manner.

Having described the simpler form of the circuit of apparatus 100, attention is directed to the remainder of FIG. 3, which encompasses the vote circuit. Only a very simple form is shown, but it will be understood to apply to any apparatus.

In addition to the threshold circuits 108, 109 and 110, it will be seen that each of the detectors 105, 106 and 107 has connections to blocks 144, 145, 146 and 147 which are labeled overlap circuits. The connections are designated 148, 149, 150 and 151. The connection 148 extends to block 144 and is labeled O-SM-1 signifying overlap, small-medium, channel 1. In the same form of identification, the connection 149 extends between the detector 106 to the block 145 which is labeled O-SM-2; the connection 150 also extends from the detector 106 but to a different block 146 labeled O-ML-1; and the connection 151 extends from the detector 107 to the block 147 labeled O-ML-2.

Since each range of the three, representing the small, medium and large particles, has limits which are established by the threshold circuits 108, 109 and 110, it would be impractical to have overlap between the ranges in the actual counting circuits because the counts would be improper. Accordingly, with no common count in adjacent channels there would be no equal counts between which to make comparisons in order to vote as described in connection with the apparatus of FIGS. 1 and 2 where the apertures are all the same size, and where assuming no clogging, the counts from all channels should be practically the same.

In order to provide conditions in which there should be equal counts, at the same time that the normal signals from the three ranges are being processed in the apparatus, each range is caused to produce a count representing a population within a narrow size segment of the range alongside its next range, and on both ends thereof. Thus, two narrow segments are chosen at opposite ends of each of the middle range and one narrow segment at the contiguous end of the smallest and largest ranges, for the purpose of providing counts in adjacently sized aperture tubes which may be compared in order to ascertain whether there is clogging or not.

In the highly simplified apparatus of FIG. 3 there are only three apertures and three ranges and hence the smaller range has a segment chosen close to its end adjacent the medium range, and for convenience this is called overlap small-medium 1, although there may or may not be overlap of this segment relative to the small and medium ranges. The segment may be all in the small range or all in the medium range. The medium range will have a segment chosen at its smallest end, which is identical in coverage to the one chosen in the smaller range and is also identified as overlap small-medium, but is given the number 2, because it is derived from the second aperture. The medium range has another size segment chosen at its largest end, and this is identified as overlap medium-large 1. The large range, it follows, will have a narrow size segment chosen at its smallest end, identical in limits to those of the same segment of the medium range, and this is identified as overlap medium-large 2, because it is derived from another aperture.

The segments are chosen by suitable window thresholds and product signals which pass along four channels. These signals are shaped in suitable shaping circuits, integrated, and passed through timing and multiplying circuits identical to those of the normal channels for the respective apertures which were described above. All of such circuitry is included in each of the blocks 144, 145, 146 and 147 for simplicity, so that the outputs 152, 153, 154 and 155 have voltages properly weighted considering the several factors of time and aperture size mentioned above. If there is no clogging, the voltages at 152 and 153 should be substantially equal, and the voltages at 154 and 155 should be substantially equal. These signals are applied in pairs to the differential amplifiers 156 and 157 respectively, and the outputs are measured by the threshold circuits 158 and 159. If there is a sufficient output at 161 caused by the clogging of either the small or medium aperture tube, there will be a signal on the lead 162 applying an input to the AND circuit 163 and the inhibit circuit 164. The AND circuit 163 will not produce an output at any of its three output connections 165, 166 and 167 unless there is also a signal at its input lead 168. If the only aperture clogging is the small one, then the overlap channels O–ML–1 and O–ML–2 will have the same outputs and there will be no signal output at 169 from the differential amplifier 157. There will be no signal on the connection 168, which extends to the inhibit circuit 171 and the AND circuit 163.

The inhibit circuits 164 and 171 are the type of logic elements which will have an output due to a first signal input unless a signal appears on another input to inhibit the output. In this case, the inhibit circuit 164 will have a signal output at 172 any time there is a voltage on the input connection 162, unless there is also a signal on its second input connection 167. If there is an output at 172, the switch 134 is opened, and the read-out 124 is rendered inoperative, from that time on. There may be a portion of the information sought which is a fair sample, so that if the fraction is known from some other measurement, it may still be used.

In any event, the only time that there will be an output at 165 from the AND circuit is in the event that both of the differential amplifiers are producing signal outputs. This must occur only when there is a disparity beyond the limits chosen in both the overlap circuits 145 and 146 which can only be caused if the medium aperture is clogged. When this occurs, there will be a signal at the inputs 166 and 167 of the inhibit circuits, so that neither of them will produce a signal to open the switches 134 and 136. Instead, only the switch 135 is opened by the signal appearing at 165 so that the read-out 125 is rendered inoperative. In like fashion, it can be seen that when the large aperture clogs, only the read-out 126 will be rendered inoperative.

In any case of clogging, a suitable debris alarm at 174 or 175 can alert the operator. These are operated by the threshold circuits 158 and 159 respectively.

A simplified arrangement would eliminate the inhibit circuits 164 and 171 and their connections 172, 173, 167 and 166. Instead, the leads 162 and 168 would go directly to the AND circuit 163. A blockage of the small aperture would operate the debris alarm 174 and not the switch 135. The operator would see that the SM alarm had been energized, and if the readout 125 is still not deenergized, he would know that the blockage is in the small aperture and would disregard the information obtained from the read-out 124. If the read-out 125 were de-energized irrespective of which alarm was operated he would know that the blockage is in the medium aperture. If the alarm 175 were energized and the read-out 125 was still operating he would know that the read-out 126 would have to be disregarded.

The above discussion assumes that there will rarely be any simultaneous clogging of two apertures in a simple system of this kind. This will occur, although infrequently, and will cause an anomoly. If the blockages are in any two apertures, only the read-out 125 will be automatically disabled, and both debris alarms will operate. The operator cannot know which apertures are clogged without additional information. This can be supplied by other circuitry. The circuit of FIG. 3 is only exemplary, however, and is highly simplified to show the operation of the multiple aperture apparatus and the use of a vote circuit when overlap segments are required. In an actual device there may be several times more apertures, and each aperture may be handling a plurality of channels within a range of sizes. In the event that a circuit such as 100 of FIG. 3 is actually intended to be used in its most simplified form, an additional signal could be derived from each detector 105, 106 and 107 which is totally independent of the others and which is in the form of an additional debris alarm, energized, for example, by low frequency signals which are characteristic of the signals from a blocked aperture. These debris alarms would positively identify single blocked apertures to assist in the use of the information from the read-outs.

In FIGS. 4 and 5 there are illustrated two arrangements of apertures which enables application of the invention to a static sample system or to a flow-through system. The structures illustrated in each case would form a part of the so-called scanning system of any of the apparatuses of FIGS. 1, 2 and 3.

In FIG. 4, there is a sample container 200 having a sample suspension 201 of particles therein. This forms the static upstream sample fluid body. Three aperture tubes of conventional construction are shown at 202, 203 and 204, suspended in the sample suspension, with their apertures 205, 206 and 207 below the surface. Each has an electrode 208, 209 and 210 connected respectively to electrical leads as shown at 211, 212 and 213. A single common electrode 214 is immersed in the sample and has an external connection at 215. Each aperture tube is connected to a fitting as at 216, 217 and 218 which is connected in turn to the common barrel 219 of a stopcock 220. The center plug 221 has transverse passageways 222, 223 and 224 adapted to align the respective fittings 216, 217 and 218 with the nipples 225, 226 and 227 respectively. By the valving arrangement, sample may simultaneously be drawn through all apertures 205, 206 and 207 using separate vacuum sources connected to the nipples. The aperture tube interiors are thus upstream of the apertures. Other pumping or siphoning arrangements may be used. The scanning system of any given apparatus may have different flow producing devices, different kinds of electrodes, different arrangements of aperture tubes. For example, one integral structure may be chambered, with an aperture leading to each chamber and an independent electrode in each chamber, and an independent electrical lead extending from each electrode.

There will be a separate aperture current supply and a separate detector for each aperture, as previously explained. The current supply and detector for each aperture will be connected each between the single electrical lead from that aperture tube and the common lead.

It is essential that there be minimum electrical leakage between the downstream electrodes. The various possible paths through the fluid can be blocked by suitable means. For example, leakage through fluid carried as a film between the barrel 219 and plug 221 can be obviated by having a series of independent stopcocks, all actuated by a common insulated linkage or separate actuators. Leakage in the conduits extending to the vacuum sources or source (in case only one is used) may be eliminated by the use of simple scavenging jars such as that shown in FIG. 4 where the conduit 228 enters vessel 229 where the stream is broken before passing out by way of the conduit 230.

In the preferred apparatus, the detector has extremely low impedance input, thereby decreasing the amount and likelihood of leakage through all other paths which are high impedance in character.

In the case of FIG. 5, instead of a static system, it is assumed that sample fluid 250 is continuously flowing in a pipe 231. The pipe is of insulating material and has three apertures 232, 233 and 234 in its side wall. Each aperture leads to a separate conduit 235, 236 and 237 respectively, by means of which sample fluid may be drawn through the apertures through the use of vacuum and the like. There is a common electrode 238 in the pipe 231 leading to a common electrical lead 239 which may be grounded. There are individual electrodes 240, 241 and 242 in the respective conduits 235, 236 and 237 connected with the conductors 244, 245 and 246, respectively. The current sources and detectors are connected as described above. In this case, the sample suspension passing the apertures is considered upstream of the apertures and the bodies of fluid within conduits 235, 236 and 237 are considered downstream.

Although no specific electrical circuits are shown or detailed in connection with the blocks of the block diagrams, the individual components which may be used are well-known in the electronics field. They are capable of considerable variation, depending upon the requirements of the system, and to some extent choices of the designer. Some may be combined to provide a desired function or functions, well within the scope of the invention. The invention lies in the combination of components to achieve the desired functions and results.

What it is desired to secure by Letters Patent of the United States is:

1. Apparatus for analyzing particles suspended in a fluid which comprises
    (a) a plurality of constricted passageways adapted to have fluid with particles suspended therein moved through said passageways,
    (b) means for moving at least a potrion of said fluid through said passageways,
    (c) independent scanning means coupled to each passageway and each scanning means being responsive to the passage of particles through its passageway to produce an electric signal for each passing particle the value of which is related to the dimensions of the respective particles,
    (d) a separate detecting means for detecting and responding to said signals connected with each said scanning means, and
    (e) signal comparison and exclusion circuitry responsive to the detecting means associated with at least two of said passageways for comparing the outputs from said detecting means against each other and excluding at least the output derived from the signals from one of said passageways in the event of an unfavorable comparison.

2. Apparatus as claimed in claim 1 in which said moving means are arranged to move said potrion through said passageways simultaneously.

3. Apparatus as claimed in claim 1 in which said passageways comprise apertures and said scanning means are of the Coulter type.

4. Apparatus as claimed in claim 1 in which at least one pair of said passageways are the same size.

5. Apparatus as claimed in claim 1 in which the passageways are the same size, and there is also provided voting circuit means for identifying any response which differs from all of the others.

6. Apparatus as claimed in claim 1 in which there is provided an averaging device and read-out means connected to the output of said averaging device, at least a pair of said detecting means being connected to the imput of said averaging device.

7. Apparatus for analyzing particles suspended in a fluid by the use of the Coulter principle which comprises
    (a) a first vessel carrying a first body of fluid having particles suspended therein,
    (b) means in said first vessel providing a plurality of apertures to enable flow of fluid from said first vessel only through said apertures,
    (c) a plurality of second vessels and each aperture connecting said first vessel with a respective one of said second vessels,
    (d) means for causing fluid to move through said apertures,
    (e) an electrode in each of said second vessels,
    (f) a common electrode in said first vessel,
    (g) a separate scanning-detecting circuit including a current source and detector connected to each respective electrode in said second vessels and to said common electrode to produce an electrical pulse in the scanning-detecting circuit through whose aperture a particle passes when the particle passes, the current sources serving to establish a stable constricted electrical current through said respective apertures between said first vessel and each of the respective second vessels, and
    (h) means responsive to said pulses detected by each scanner-detector circuit to provide an electrical signal indicative of the number of particles passing through said aperture with said fluid.

8. Apparatus as claimed in claim 7 in which the apertures are all of the same size and said last means include an averaging circuit to ascertain the average number of particles passing through said apertures.

9. Apparatus as claimed in claim 7 in which there is at least one electrical channel individual to each scanning-detecting circuit and said apertures are of the same size and said last means comprise pulse-accumulating means individual to each scanning-detector circuit and an averaging device operated by all accumulating means.

10. Apparatus as calimed in claim 9 in which there is a voting circuit to detect and discard the pulses from scanning-detecting circuits which produce an abnormal number of pulses, which comprises
    (a) a plurality of differential comparators, each connected to a pair of accumulating means and responsive to the signal level in each one of said pair to produce an output signal only when one accumulated signal level is different from the other of the pair by some preselected value, (b) switch means interposed between each accumulating means and said averaging device, and
(c) circuitry connected with said switch means operated when any comparator produces an output signal to disconnect from said averaging device the accumulating means of said scanning-detecting circuit producing an abnormal number of pulses.

11. In a multiple channel particle analyzing device in which there are pulses produced in each channel responsive to the passage of particles through a constricted current path of small dimensions and in which each channel has pulse accumulating means and read-out means, a voting circuit to enable the detecting and discarding of the pulses from any channel which is abnormal, said circuit comprising:
(a) at least a first discriminating circuit in each channel,
(b) certain pairs of channels each having one of said first discriminating circuits adjusted to pass pulses representing the same size range of particles whereby each of such first discriminating circuits will pass substantially the same number of pulses if the said pair of channels are normal in operation, but different numbers of pulses if one of the channels is abnormal in operation,
(c) an accumulating circuit connected to each first discriminating circuit,
(d) a differential comparator connected with the accumulating circuits and adapted to produce an abnormal-indicating output signal if one channel of said pair of channels is abnormal, and
(e) switch means driven by said abnormal-indicating output signal to disable the accumulating circuit of said abnormal channel.

12. A voting circuit according to claim 11 in which, in addition,
(f) there is at least a pair of second discriminating circuits, one of which is connected to a channel also having one of said first discriminating circuits, and an accumulating circuit connected with each second discriminating circuit,
(g) a second differential comparator connected with the accumulating circuits of said second discriminating circuits, and
(h) circuit means for cross-comparing the signal levels of said accumulating means including AND gate means and operating said switch means.

13. A voting circuit according to claim 11 which further comprises:
(f) a mathematic factor adjusting circuit coupled between each said differential comparator and said switch means.

14. A method of analyzing a particle ssytem through the use of a plurality of apertures which comprises: passing a fluid containing particles from a first body of such fluid through said apertures, transducing such particle passing and generating pulses in each aperture representative of the particles passing therethrough, depositing the fluid passing through the apertures into a plurality of second bodies electrically and physically independent of one another but for the apertures, detecting the generated pulses from each aperture independently, electronically comparing the detected pulses from at least two apertures and, in the event of an unfavorable comparison, actively responding thereto so as to maintain the validity of the analysis.

15. A method according to claim 14 in which said responding includes initiating an alarm.

16. A method according to claim 14 in which said responding includes identifying a malfunctioning aperture.

17. A method according to claim 16 in which said responding further includes discarding of the signals from the malfunctioning aperture.

18. A multiple aperture particle analysis apparatus, comprising (a) a plurality of apertures, each aperture having a current source for establishing a constricted electrical current flowing therethrough when immersed in a conducting fluid,
(b) a common source of fluid having particles suspended therein and communicating with each aperture so that fluid may be passed from said common source through all of said apertures,
(c) fluid moving means for causing said fluid to move through said apertures, each aperture having a separate receiving vessel adapted to have a quantity of fluid carried therein and each having an independent electrode therein, the common source having an electrode therein electrically common with all of the independent electrodes,
(d) scanning and detecting means for each aperture independent of all others, for producing electrical pulses with the passage of particles through said aperture,
(e) circuit means establishing for each aperture at least one electrical channel connected with said scanning and detecting means and including means therein to discriminate against all electrical pulses produced by said aperture except for a certain predetermined class, and
(f) read-out means connected with each channel to indicate the number of pulses passing through each channel.

19. Apparatus as claimed in claim 18 in which means are provided to compare the pulses in adjacent channels and produce signals representing said comparison, and means operated by said comparing means to discard one or more of said adjacent channels in the event said comparison is in accordance with a predetermined relationship.

20. Apparatus for analyzing particles suspended in a fluid which comprises
(a) a plurality of constricted passageways adapted to have fluid with particles suspended therein moved through said passageways,
(b) means for moving at least a portion of said fluid through said passageways,
(c) independent scanning means coupled to each passageway and each scanning means being responsive to the passage of particles through its passageway to produce an electric signal for each passing particle the value of which is related to the dimensions of the respective particles,
(d) a separate detecting means connected with each scanning means for detecting and responding to said signals, said detecting means each defining a predetermined range of signal sizes, and
(e) overlap circuits coupled to said detecting means for extracting portions of the signals from each range, such portions normally being of the same size signals.

21. Apparatus for analyzing particles suspended in a fluid which comprises
(a) a plurality of constricted pasageways adapted to have fluid with particles suspended therein moved through said passageways,
(b) means for moving at least a portion of said fluid through said passageways,
(c) independent scanning means coupled to each passageway and each scanning means being responsive to the passage of particles through its passageway to produce an electric signal for each passing particle the value of which is related to the dimensions of the respective particles,
(d) a separate detecting means for detecting and responding to said signals connected with each said scanning means,
(e) an averaging device connected to each detecting means, (f) readout means connected to said averaging device, and
(g) voting circuit means arranged to disconnect that detecting means whose response is different from the others from said averaging device.

22. Apparatus for analyzing particles suspended in a fluid which comprises
(a) a plurality of constricted passageways adapted to have fluid with particles suspended therein moved through said passageways,
(b) means for moving at least a portion of said fluid through said passageways,
(c) independent scanning means coupled to each passageway and each scanning means being responsive to the passage of particles through its passageway to produce an electric signal for each passing particle the value of which is related to the dimensions of the respective particles,
(d) a separate detecting means for detecting and responding to said signals connected with each said scanning means, and
(e) a separate readout means for each passageway connected with said respective detecting means, each said passageway being of different size.

23. A structure as claimed in claim 22 in which said detecting means include discriminating means to channel signals of only a predetermined different range of signal sizes to each read-out means.

24. A structure as claimed in claim 22 in which differential comparator means are provided to compare portions of the signals from pairs of said detecting means, which portions are normally of the same size, to obtain signals indicating abnormally sized signals in one of the detecting means, and a voting circuit operated by said differential comparator means to disconnect the detecting means having said abnormally sized signals from its read-out means.

References Cited
UNITED STATES PATENTS

| | | | |
|---|---|---|---|
| 2,248,982 | 7/1941 | Gillbergh | 324—30 XR |
| 2,656,508 | 10/1953 | Coulter | 324—71 |
| 2,928,406 | 3/1960 | Cunniff et al. | 324—30 XR |
| 3,192,473 | 6/1965 | Marsh | 324—61 XR |
| 3,259,842 | 7/1966 | Coulter et al. | 324—65 XR |
| 3,339,137 | 9/1967 | Perry | 324—61 |

RUDOLPH V. ROLINEC, *Primary Examiner.*

E. E. KUBASIEWICZ, *Assistant Examiner.*

U.S. Cl. X.R.

235—92